US012254811B2

(12) United States Patent
Zhao

(10) Patent No.: US 12,254,811 B2
(45) Date of Patent: Mar. 18, 2025

(54) DISPLAY PANEL, CONTROL METHOD THEREOF, AND ELECTRONIC TERMINAL

(71) Applicant: TCL CHINA STAR OPTOELECTRONICS TECHNOLOGY CO., LTD., Guangdong (CN)

(72) Inventor: Yizhuo Zhao, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/305,399

(22) Filed: Apr. 24, 2023

(65) Prior Publication Data

US 2024/0265844 A1 Aug. 8, 2024

(30) Foreign Application Priority Data

Feb. 7, 2023 (CN) ......................... 202310122358.0

(51) Int. Cl.
*G09G 3/20* (2006.01)
*G09G 3/36* (2006.01)

(52) U.S. Cl.
CPC ............. *G09G 3/2092* (2013.01); *G09G 3/20* (2013.01); *G09G 3/3648* (2013.01); *G09G 3/3655* (2013.01); *G09G 3/204* (2013.01); *G09G 2320/0233* (2013.01); *G09G 2320/0247* (2013.01); *G09G 2320/0626* (2013.01); *G09G 2340/0435* (2013.01)

(58) Field of Classification Search
CPC ......... G09G 3/3648; G09G 2340/0435; G09G 3/2092; G09G 3/20; G09G 2310/061; G09G 2320/0247; G09G 2320/0626; G09G 2320/0233; G09G 2320/0242; G09G 3/3696; G09G 3/3655; G09G 3/2022; G09G 3/204
See application file for complete search history.

(56) References Cited

U.S. PATENT DOCUMENTS

| | | | | |
|---|---|---|---|---|
| 10,127,882 | B2 * | 11/2018 | Kim | G09G 3/3696 |
| 11,961,440 | B2 * | 4/2024 | Li | G09G 3/20 |
| 12,073,779 | B2 * | 8/2024 | Chun | G09G 5/008 |
| 2012/0274624 | A1 * | 11/2012 | Lee | G09G 3/3648<br>345/213 |
| 2013/0038621 | A1 * | 2/2013 | Choi | G06T 1/20<br>345/589 |
| 2017/0206850 | A1 * | 7/2017 | Kim | G09G 3/3696 |
| 2018/0024386 | A1 * | 1/2018 | Kim | G09G 3/3655<br>349/36 |
| 2018/0122327 | A1 * | 5/2018 | Kim | G09G 3/3688 |
| 2021/0225226 | A1 * | 7/2021 | Chen | G09G 3/3677 |
| 2022/0084450 | A1 * | 3/2022 | Kim | G09G 3/20 |
| 2023/0075226 | A1 * | 3/2023 | Lee | G09G 3/2096 |

* cited by examiner

*Primary Examiner* — Dismery Mercedes
(74) *Attorney, Agent, or Firm* — PV IP PC; Wei Te Chung

(57) ABSTRACT

A display panel, a control method thereof, and an electronic terminal are provided. The control method includes: determining whether a display frequency of the display panel is converted in each of x frames, wherein x is a positive integer greater than or equal to 2; and in response to determining that the display frequency of the display panel is converted in each of the x frames, changing a common voltage from a first voltage gradually to a second voltage in a plurality of frames, from at least a last frame in the x frames.

12 Claims, 4 Drawing Sheets

DISPLAY PANEL, CONTROL METHOD THEREOF, AND ELECTRONIC TERMINAL

CROSS-REFERENCE TO RELATED APPLICATION

This application claims priority to Chinese Patent Application No. 202310122358.0, filed on Feb. 7, 2023. The disclosure of the aforementioned application is incorporated herein by reference in its entirety.

TECHNICAL FIELD

The present disclosure relates to display technology, and particularly, to manufacturing of a display panel, and more particularly, to a display panel, a control method thereof, and an electronic terminal.

BACKGROUND

With popularity of liquid crystal display (LCD) panels, Free-Sync technologies with a dynamic refresh rate function have emerged for matching a refresh frequency of a display picture with a refresh frequency of a display.

In the Free Sync technology, a blanking duration of a frame picture under a high refresh frequency is set to be different from that of a frame picture under a low refresh frequency, to match different frame frequencies, which inevitably causes the blanking time of the frame picture under the low refresh frequency not to be equal to the blanking time of the frame picture under the high refresh frequency. Therefore, power leakage degree of the display panel under the high refresh frequency is different from that under the low refresh frequency and thus generates a luminance difference. Based on this, a voltage of a common electrode on an array substrate is generally changed, to change a storage capacitance. The luminance difference may be improved. However, it may require a greater voltage variation value of the common electrode on the array substrate side when the high refresh frequency and low refresh frequency are switched, and the greater voltage variation value occurs in a later frame picture during the refresh frequency switching of the display, so that the display picture flickers.

Therefore, the conventional LCD panel has the above problems and urgently needs to be improved.

SUMMARY

In view of the above, an embodiment of the present application provides a control method of a display panel, including: determining whether a display frequency of the display panel is converted in each of x frames, where x is a positive integer greater than or equal to 2; and in response to determining that the display frequency of the display panel is converted in each of the x frames, adjusting a common voltage from a first voltage gradually to a second voltage in a plurality of frames beginning, from at least a last frame in the x frames.

In another aspect, an embodiment of the present application provides a display panel including: a controller configured to perform a control method of the display panel including: determining whether a display frequency of the display panel is converted in each of x frames, where x is a positive integer greater than or equal to 2; and in response to determining that the display frequency of the display panel is converted in each of the x frames, adjusting a common voltage from a first voltage gradually to a second voltage in a plurality of frames beginning, from at least a last frame in the x frames.

In another aspect, an embodiment of the present application provides an electronic terminal including the display panel as described above.

BRIEF DESCRIPTION OF THE DRAWINGS

The present disclosure is further illustrated by the accompanying drawings. It will be noted that the accompanying drawings in the following description are merely some embodiments of the present disclosure, and other drawings may be obtained from these drawings without creative effort by those skilled in the art.

DETAILED DESCRIPTION

Technical solutions in embodiments of the present disclosure will be clearly and completely described below in conjunction with accompanying drawings in the embodiments of the present disclosure. It will be apparent that the embodiments described below are merely part of, but not all of, the embodiments of the present disclosure. Based on the embodiments in the present application, all other embodiments obtained by those skilled in the art without creative work fall within the protection scope of the present application.

The terms "first", "second", etc. are used in the present disclosure to distinguish different objects and not to describe a particular order. Furthermore, the terms "include/comprises" and "having", and any variation thereof, are intended to cover non-exclusive inclusion. For example, a process, method, system, product, or apparatus including a series of steps or modules includes, but is not limited to, the listed steps or modules, but optionally also includes steps or modules that are not listed, or optionally also includes other steps or modules that are inherent to those processes, methods, products or apparatus.

"embodiments" herein mean that particular features, structures, or characteristics described in connection with the embodiments may be included in at least one embodiment of the present disclosure. The occurrence of the phrase at various times and sections in the specification does not necessarily mean the same embodiment, nor is it a separate or alternative embodiment that is mutually exclusive with other embodiments. It is understood, both explicitly and implicitly, by those skilled in the art that the embodiments described herein may be combined with other embodiments.

In an embodiment of the present disclosure, a controlling method of a display panel is provided. The controlling method of the display panel includes, but is not limited to, the following embodiments and combinations of the following embodiments.

Figure 1:
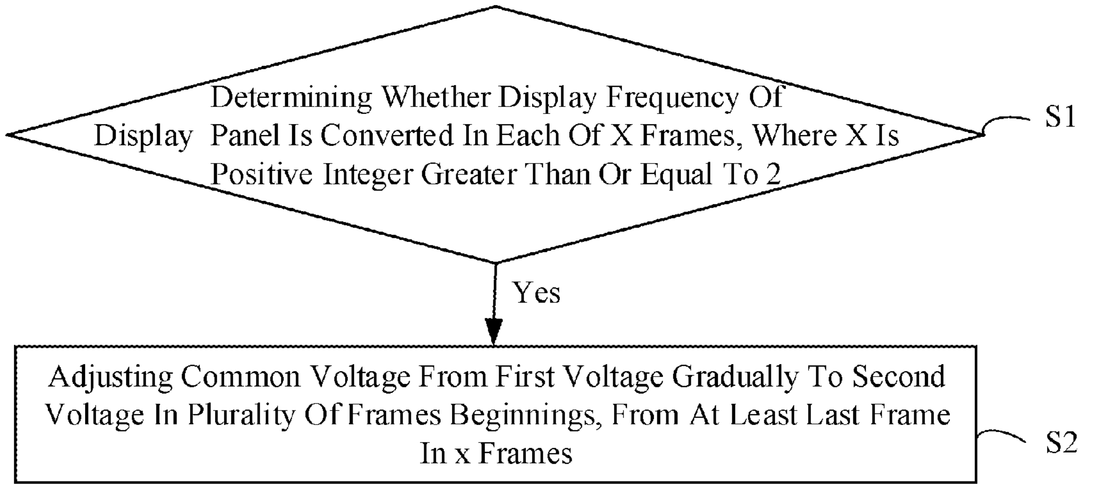
FIG. 1 is a flowchart of a control method of a display panel according to an embodiment of the present disclosure.

In an embodiment, as shown in FIG. 1, the control method of the display panel may include but is not limited to, the following steps.

At step S1, it is determined whether a display frequency of the display panel is converted in each of x frames, wherein x is a positive integer greater than or equal to 2; and In particular, the display panel may be, but is not limited to, an OLED display panel or a liquid crystal display panel. Sub-pixels in the OLED display panel and sub-pixels in the liquid crystal display panel may both emit light under the driving of corresponding pixel driving circuits. In a frame, a pixel driving circuit may load a data signal transmitted through a corresponding data line during an on period of a gate signal transmitted through a corresponding gate line, and maintain the data signal by a storage capacitor during an off period of the gate signal transmitted through the corresponding gate line, so as to control the corresponding sub-pixels to emit light continuously until a gate signal transmitted through the corresponding gate line in the next frame is again in the on period. It may be considered that the OLED display panel differs from the liquid crystal display panel in that sub-pixels of the OLED display panel may be a self-light-emitting device. The self-light-emitting device emits light in response to a data signal to present corresponding luminance. The sub-pixel of the liquid crystal display panel may emit light by using a pixel electrode and a backlight panel. Liquid crystal molecules are oriented by a data signal, to control the amount of light generated by the backlight panel that may penetrate the liquid crystal layer, so as to present a corresponding luminance.

Each frame of picture may have a corresponding display frequency. The display frequency may be the reciprocal of the duration of a frame of picture. "the duration of the frame of picture" may mean that a time difference between a start time of a first row of sub-pixels turned on in a corresponding frame of picture and a start time of a first row of sub-pixels turned on in a next frame of picture. In conjunction with the above discussion, "the duration of the frame of picture" may include the sum of the duration for all rows of sub-pixels in a frame to turn on in order to emit light, and a subsequent duration (blanking duration) for all rows of sub-pixels to commonly maintain light.

It should be noted that when the display frequency is switched after the FreeSync function is applied to the display panel, it is possible to realize that the display frequency has different values in the two adjacent frames. It can be seen from the above discussion that if the multi frames have the same amount of time for all rows of sub-pixels to turn on in sequence to emit light, when the display frequencies of two adjacent frames are different, the corresponding two blanking durations are different, that is, the leakage durations of the devices in the corresponding two pixel driving circuits are different, and the luminance of the corresponding two frame pictures is different.

In the present embodiment, there is no limitation on the number (x) of frames during which a picture whose display frequency is converted maintains, and no limitation on the specific degree of the frequency conversion. It can be considered that step S1 is intended to determine whether the display frequency is converted in each of at least two frames. With reference to the above discussion, if the above frequency conversion does occur no intervention is made, the luminance of the corresponding two frames of pictures is different.

Figure 2:
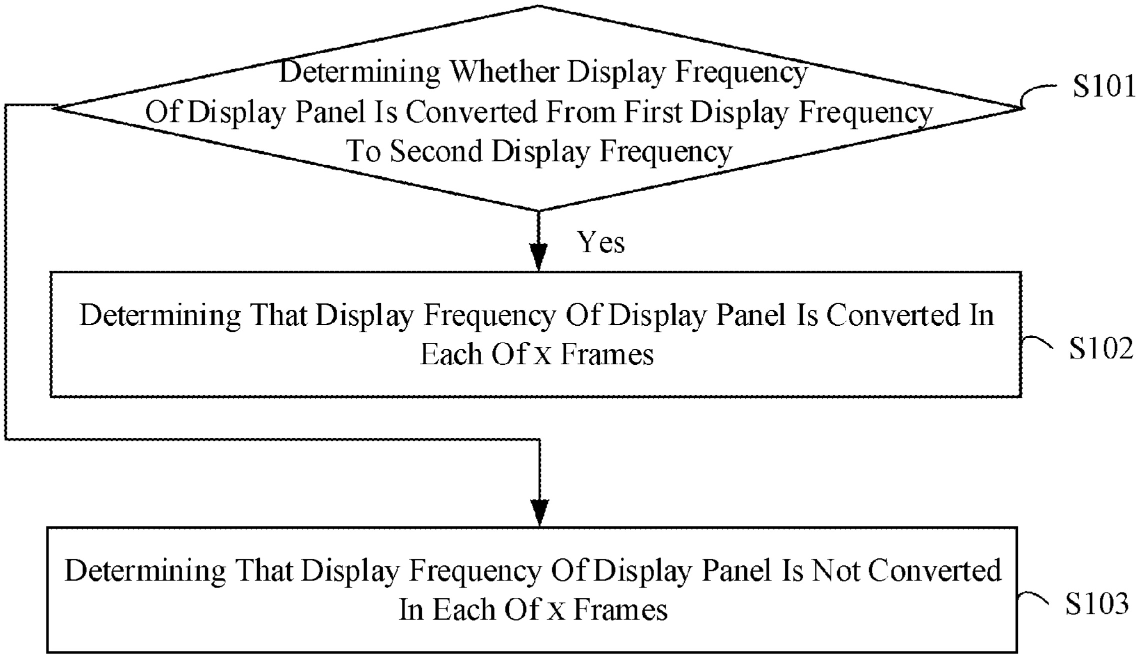
FIG. 2 is a flowchart of a control method of a display panel according to another embodiment of the present disclosure.

In an embodiment, as shown in FIG. 2, the step S1 may include, but is not limited to, the following steps.

At step S101, it is determined whether the display frequency of the display panel is converted from a first display frequency to a second display frequency.

In connection with the above discussion, this step may be understood as determining whether the display frequency is converted from the first display frequency to the second display frequency in the x frames, and a difference value between the first display frequency and the second display frequency is positively correlated with x. in particular, as discussed above, the difference value between the first display frequency and the second display frequency may be positively correlated with x. For example, the larger the difference value between the first display frequency and the second display frequency, the larger x may be set, and vice versa.

In connection with the above discussion, in response to a result of determining whether the display frequency is converted from the first display frequency to the second display frequency in the x frames, it is determined whether the display frequency is converted in each of the x frames. If the result at step S101 is "Yes", S102 is performed to determine that the display frequency of the display panel is converted in each of the x frames. If the result at step S101 is "No", S103 is performed to determine that the display frequency of the display panel is not converted in each of the x frames. As can be seen from the above discussion, the "yes" and "no" of the display frequency being inverted in each of the x frames is the same as "yes" and "no" of the display frequency being inverted from the first display frequency to the second display frequency in the x frames.

At step S1, in response to determining that the display frequency is converted in each of the x frames, then

S2, adjusting a common voltage from a first voltage gradually to a second voltage in a plurality of frames beginning, from at least a last frame in the x frames.

As discussed above with respect to the pixel driving circuit, the two plates of the storage capacitor may be composed of a first common electrode and a second common electrode, respectively. The first common electrode and the second common electrode may be respectively applied with a first common voltage and a second common voltage. Therefore, in the case that one of the first common voltage and the second common voltage is constant, the magnitude of another one of the first common electrode and the second common electrode may determine the degree of conductance of the another one of the first common electrode and the second common electrode, thereby determining the arrangement of electrons and positive charges inside the storage capacitor, thereby determining the capacitance value of the storage capacitor.

It will be appreciated that if there is a conversion in the display frequency, first, in the present embodiment, the common voltage is controlled to adjust from the first voltage to the second voltage from at least the last frame in the x frames, that is, from at least the display frequency converted to the second display frequency. With reference to the above discussion on the storage capacitance, in the present embodiment, the capacitance value of the storage capacitor may be changed from the first capacitance value corresponding to the first voltage to the second capacitance value corresponding to the second voltage. That is, the differential setting of the capacitance value of the storage capacitor in the two pixel driving circuit corresponding to two frames with different display frequencies can be realized, thereby reducing the luminance difference.

Further, in combination with the discussion in step S2, from at least a time where the display frequency is changed to the second display frequency, the common voltage is gradually changed from the first voltage to the second voltage in a plurality of frames, instead of changing the common voltage instantaneously from the first voltage to the second voltage when the display frequency is changed from the first display frequency to the second display frequency (that is, in a frame corresponding to the second display frequency). That is, in the present embodiment, the number of frames during which the common voltage is changed from the first voltage to the second voltage is increased, so that the phenomenon that the common voltage changes rapidly may be avoided, and the picture flashing may be effectively improved.

Figure 3:
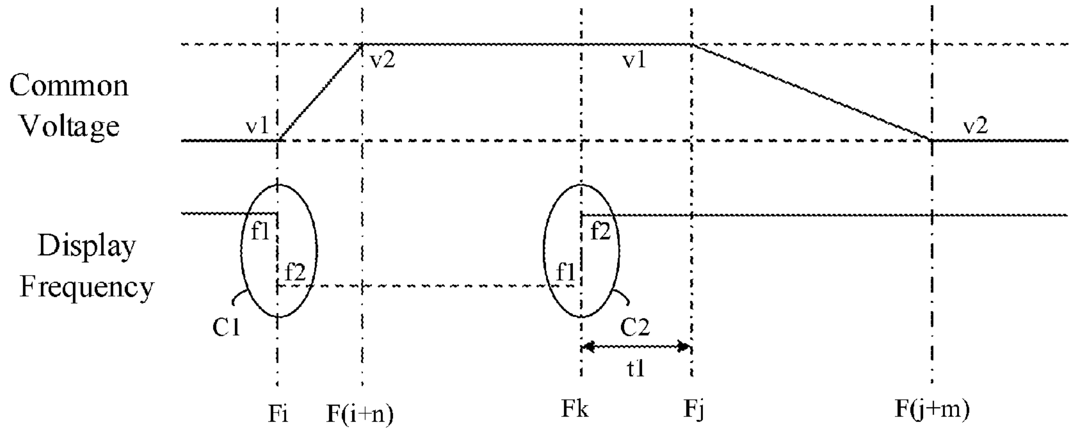
FIG. 3 is a waveform diagram of both a common voltage and a display frequency according to an embodiment of the present disclosure.

In particular, as shown in FIG. 3, for example, in the first frequency switching C1, the first display frequency f1 is larger than the second display frequency f2, and the first voltage v1 is smaller than the second voltage v2. That is, if the display frequency is reduced from the first display frequency f1 as a higher frequency to the second display frequency f2 as a lower frequency, when the display frequency becomes the second display frequency f2 as the lower frequency, the common voltage is gradually increased from the smaller first voltage v1 to the larger second voltage v2 in a plurality of frames. Here, it can be seen from the above discussion and FIG. 3, the display frequency is reduced from the first display frequency f1 as a relatively high frequency to the second display frequency f2 as a relatively low frequency. Thus, the corresponding blanking duration is considered to be increased, and the leakage duration of the device in the pixel driving circuit corresponding to the sub-pixel is increased. Therefore, in the present embodiment, the common voltage is set to be gradually increased from the smaller first voltage v1 to the larger second voltage v2 in the plurality of frames (Fi to F (i+n)), so that the phenomenon that the common voltage rapidly rises may be avoided and the picture flicker may be effectively improved, where i and n are both positive integers.

Similarly, as shown in FIG. 3, for example, in the second frequency switching C2, the first display frequency f1 is smaller than the second display frequency f2, and the first voltage v1 is larger than the second voltage v2. That is, if the display frequency increases from the first display frequency f1 as a lower frequency to the second display frequency f2 as a higher frequency, when the display frequency becomes the second display frequency f2 as the lower frequency, the common voltage is gradually decreased from the larger first voltage v1 to the smaller second voltage v2 within a plurality of frames. Similarly, as can be seen from the above discussion and FIG. 3, the display frequency is increased from the lower first display frequency f1 to the higher second display frequency f2, and the common voltage is set to be gradually decreased from the larger first voltage v1 to the smaller second voltage v2 within the plurality of frames (Fj to F (j+m)), so that the phenomenon that the common voltage rapidly decreases may be avoided, and the picture blinking may be effectively improved, where j and m are both positive integers.

Figure 4:
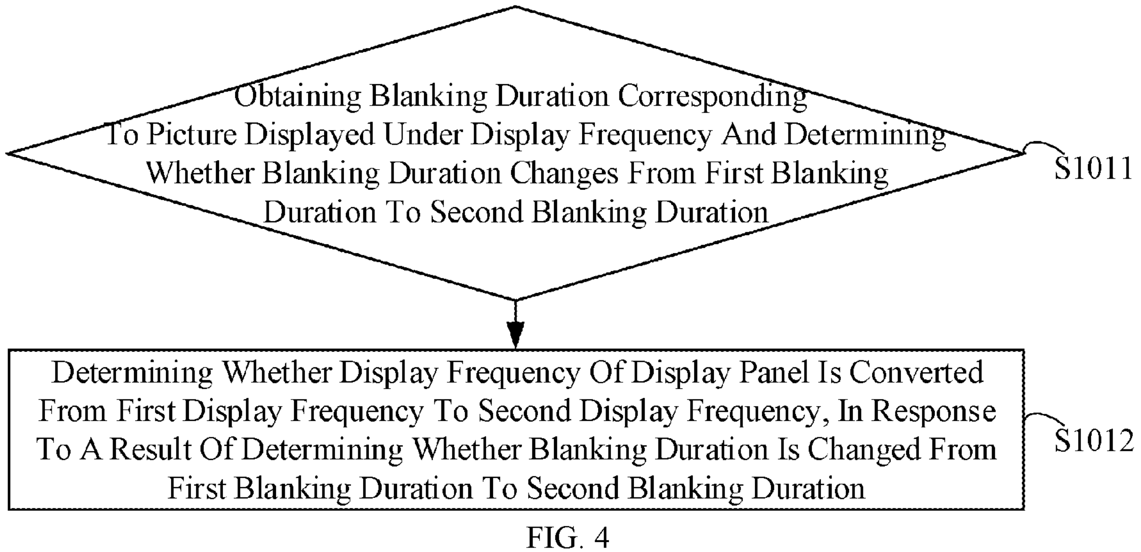
FIGS. 4 to 7 each is a flowchart of a control method of a display panel according to an embodiment of the present disclosure.

In an embodiment, as shown in FIG. 4, the control method of the display panel may include, but is not limited to, the following steps.

S1011, obtaining a blanking duration corresponding to a picture displayed under the display frequency and determining whether the blanking duration corresponding to the picture displayed under the display frequency changes from a first blanking duration to a second blanking duration; and In particular, with reference to the above discussion, the duration of each frame may include the sum of the duration for all rows of sub-pixels in a frame to turn on in order to emit light, and a subsequent duration (blanking duration) for all rows of sub-pixels to commonly maintain the light. If the multi frames have the same amount of time for all rows of sub-pixels to turn on in sequence to emit light, the blanking duration corresponding to each display frequency may be calculated from the display frequency.

S1012, determining whether the display frequency is converted from the first display frequency to the second display frequency in the x frames, in response to a result of determining whether the blanking duration is changed from the first blanking duration to the second blanking duration.

It will be appreciated that, as discussed above, the determination of whether the blanking duration has changed is equivalent to the determination of whether the display frequency has changed. Further, in the x frames, it may be determined whether the display frequency of the display panel is converted from the first display frequency to the second display frequency, in response to a result of determining whether the blanking duration is changed from the first blanking duration to the second blanking duration. If the result of step S1012 is "Yes", it is determined that the display frequency is changed from the first display frequency to the second display frequency within the x frames. Conversely, if the result of step S1012 is "No", it is determined that the display frequency is not changed from the first display frequency to the second display frequency.

Based on the steps S1101 to S1012, in response to determining that the blanking duration is converted from the first blanking duration to the second blanking duration, the result of step S1012 is "Yes". That is, the display frequency is changed from the first display frequency to the second display frequency within the x frames, the step S2 may be likewise performed, that is, the common voltage is controlled to rise from the first voltage to the second voltage within the plurality of frames.

Figure 5:
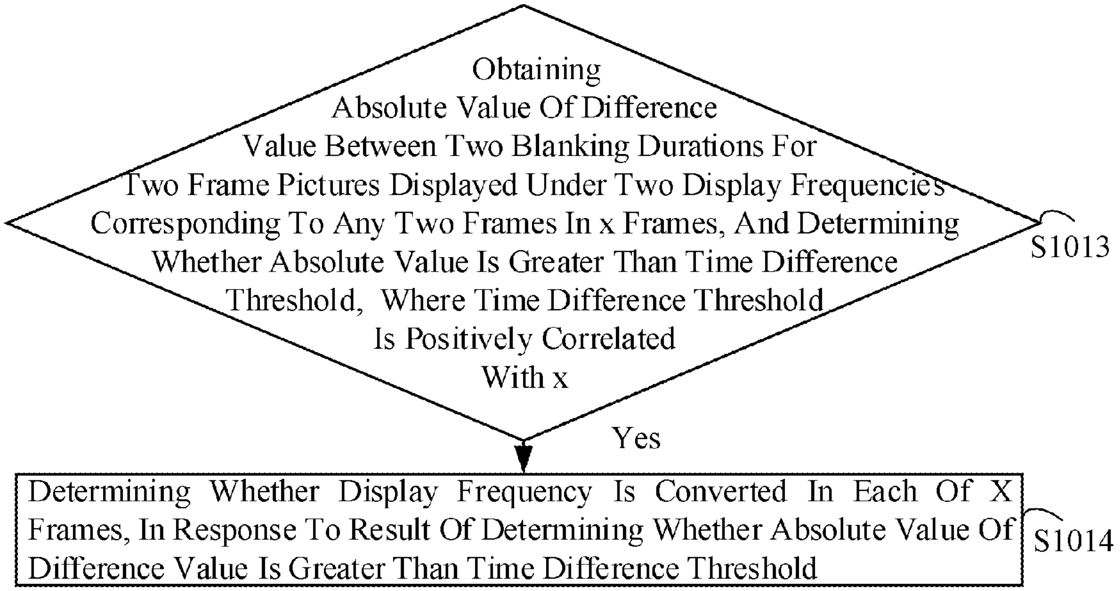

In an embodiment, as shown in FIG. 5, the control method of the display panel may include, but is not limited to, the following steps.

At step S1013, an absolute value of a difference value between two blanking durations corresponding to two frame pictures respectively displayed under two of the display frequencies respectively corresponding to any two frames in the x frames is obtained, and it is determined whether the absolute value of the difference value between the two blanking durations is greater than a time difference threshold, wherein the time difference threshold is positively correlated with x.

If the display frequency changes, the change in display frequency may be determined to be a smaller or larger change based on the magnitude relationship of "the absolute value of the difference value between the two blanking durations" in relation to the "time difference threshold". Similar to the discussion above regarding "the difference value between the first display frequency and the second display frequency is positively related to x", the time difference threshold in the present embodiment is positively related to x. For example, the larger the time difference threshold is, the larger x may be set, and vice versa.

Further, the selection of "any two frames in x frames" in the present embodiment may also be related to "time difference threshold", e.g. the larger the time difference threshold, the larger the interval between "any two frames in x frames". Conversely, the interval between "any two frames in x frames" may be set smaller, but "x frames" may still be used as the upper limit of "any two frames".

At step S1014, it is determined whether the display frequency is converted in each of the x frames, in response to a result of determining whether an absolute value of a difference value between the two blanking durations is greater than a time difference threshold.

It should be noted that the basis for "determining whether the display frequency changes from the first display frequency to the second display frequency in x frames" (i.e., "determining whether the blanking duration increases from a first blanking duration to a second blanking duration in x frames") is further defined in the present embodiment. In particular, in conjunction with the above discussion, in the present embodiment, if the result of step S1013 is "Yes", (i.e., if the change in display frequency is large, e.g., a significant reduction from the first display frequency f1 to the second display frequency f2 in the first frequency switching C1 in FIG. 3), the display frequency is inverted (frequency reduction) in x frames, or the blanking duration may be increased from the first blanking duration to the second blanking duration. For example, a significant increase from the first display frequency f1 to the second display frequency f2 in the second frequency switching C2 in FIG. 3 means that the display frequencies are all inverted (frequency increase) in x frames, or that the blanking duration is reduced from the first blanking duration to the second blanking duration.

Further, subsequently, a step S2 may be performed but is not limited hereto.

It can be understood that in the present embodiment, based on the magnitude relationship of "the absolute value of the difference value between the two blanking durations" in relation to the "time difference threshold", it is further determined whether the blanking duration changes from the first blanking duration to the second blanking duration. That is, it is further determined whether the display frequency is inverted (frequency reduction) in each of the x frames. This prevents the common voltage from being changed due to a slight change in the display frequency (which hardly causes a difference in brightness), which effectively reduces the jitter of the common voltage of the display panel and further improves the flickering phenomenon of the picture.

In particular, x may be equal to 2. That is, at step S1, it is determined whether the display frequency of the display panel is inverted in two frames, i.e. whether the display frequency corresponding to the current frame has changed relative to the display frequency corresponding to the previous frame. As discussed above, as x takes a minimum value of 2, the criterion for inverting may be set smaller, i.e. the difference value between the first display frequency and the second display frequency may be set smaller. Therefore, it is quicker to determine directly whether the display frequency has been converted based on the two display frequencies corresponding to two consecutive frames.

It will be appreciated that if the display frequency changes, the change in display frequency may be determined to be a faster or slower change depending on whether "the change in display frequency from the first display frequency to the second display frequency" occurs in two adjacent frames. In particular, in conjunction with the above discussion, in the present embodiment, if the change in the display frequency is faster, (e.g. a faster decrease from the first display frequency f1 to the second display frequency f2 in the first frequency switching C1 in FIG. 3), the blanking duration is relatively fast increased from the first blanking duration to the second blanking duration. For example, a faster increase from the first display frequency f1 to the second display frequency f2 in the second frequency switching C2 in FIG. 3, means a faster decrease in the blanking duration from the first blanking duration to the second blanking duration.

It may be understood that in response to "the change of the display frequency from the first display frequency to the second display frequency" occurring "in two adjacent frames", "controlling the change of the common voltage from the first voltage to the second voltage in at least two frames from the first frame", which allows the common voltage to be adjusted in time for a frame in which the display frequency changes (i.e. a frame corresponding to the second display frequency). Therefore, the difference in brightness of a subsequent frame (i.e. a frame corresponding to the second display frequency) compared to the luminance of the first display frequency is not consistently large, and this adjustment occurs within two frames from the first frame. Thus, it also improves the phenomenon of flickering caused by the adjustment of the common voltage.

in particular, as shown in FIG. 3, in the first frequency switching C1, for example, when the display frequency is decreased from the first display frequency f1 of the previous frame to the second display frequency f2 of the current frame (Fi), the common voltage may be gradually increased from the first voltage v1 to the second voltage v2 in at least two frames (Fi to F (i+n)) from the current frame. When the display frequency is increased from the first display frequency of the previous frame to the second display frequency of the current frame, the common voltage may be gradually decreased from the first voltage to the second voltage in at least two frames from the current frame.

Figure 6:
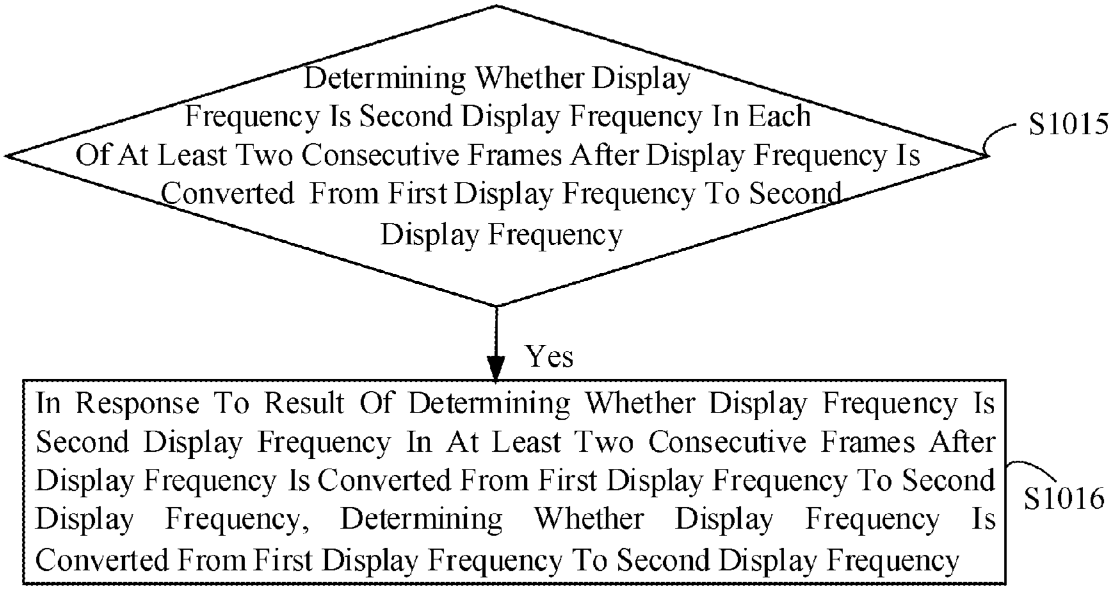

In an embodiment, as shown in FIG. 6, the control method of the display panel may include, but is not limited to, the following steps.

At step S1015, it is determined whether the display frequency is the second display frequency in each of at least two consecutive frames after the display frequency is converted from the first display frequency to the second display frequency; and In response to determining that the display frequency is converted, it is determined whether the change in display frequency is a steady or jittery change, based on "determining whether the display frequency is the second display frequency in each of at least two consecutive frames after the display frequency is converted from the first display frequency to the second display frequency".

Further, based on the result of determining whether the display frequency is the second display frequency in each of consecutive at least two frames after the display frequency is converted from the first display frequency to the second display frequency, it is determined whether the display frequency is converted from the first display frequency to the second display frequency.

At Step S1016, it is verified that the display frequency is converted from the first display frequency to the second display frequency, based on the result of determining whether the display frequency is the second display frequency in each of consecutive at least two frames after the display frequency is converted from the first display frequency to the second display frequency.

If the result at step S1015 is "Yes", it is determined that the display frequency is converted from the first display frequency to the second display frequency. Conversely, if the result of step S1015 is "No", it is determined that the display frequency is not converted from the first display frequency to the second display frequency.

Similarly, in the present embodiment, the determination basis for determining whether the display frequency is converted from the first display frequency to the second display frequency in the x frames is further defined. In particular, in conjunction with the above discussion, in the present embodiment, if the result at step S1015 is "Yes", it is determined that the display frequency is converted steadily. For example, in the second frequency switching C2 in FIG. 3, the display frequency is steadily increased from the first display frequency f1 to the second display frequency f2 (the second display frequency f2 is continuously Fk to Fj, and the total timing length is t1). It is equivalent to the blanking duration being steadily close to or maintained as the second blanking duration. Of course, it is also possible to gradually increase the common voltage from the first voltage to the second voltage when or after the display frequency is decreased from the first display frequency at the previous frame to the second display frequency at the current frame and remains at the second display frequency for a plurality of frames.

Based on Step S1015, if the display frequency is the second display frequency in each of at least two consecutive frames after the display frequency is converted from the first display frequency to the second display frequency in each of the x frames (i.e., the result at step S1015 is "Yes"), the display frequency is converted from the first display frequency to the second display frequency within the x frames. The step S2 may also be performed, and the step S2 may include but is not limited to the following steps.

At Step S201, the common voltage is controlled to gradually change from the first voltage to the second voltage in the plurality of frames, at or after a last one of the at least two consecutive frames.

At Step S201, the change of the common voltage from the first voltage to the second voltage is also further defined at or after the occurrence of the last frame of the at least two continuous frames, based on the display frequency being the second display frequency in each of at least two consecutive frames after the display frequency is converted from the first display frequency to the second display frequency in each of the x frames.

It can be understood that regarding the step of "controlling the common voltage to gradually change from the first voltage to the second voltage in the plurality of frames based on the display frequency being the second display frequency in each of at least two consecutive frames after the display frequency is converted from the first display frequency to the second display frequency in each of the x frames", the common voltage may be adjusted only when or after the display frequency is converted steadily. Therefore, it avoids a waste of control resources caused by the adjustment of the common voltage as long as the display frequency changes instantaneously (jitter, abnormal display frequency switching), thereby effectively reducing the jitter of the common voltage of the display panel, and further improving the phenomenon of picture flicker. The adjustment occurs in at least two frames from the first frame, that is, the phenomenon of picture flickering due to the common voltage adjustment can also be improved at the same time.

Figure 7:
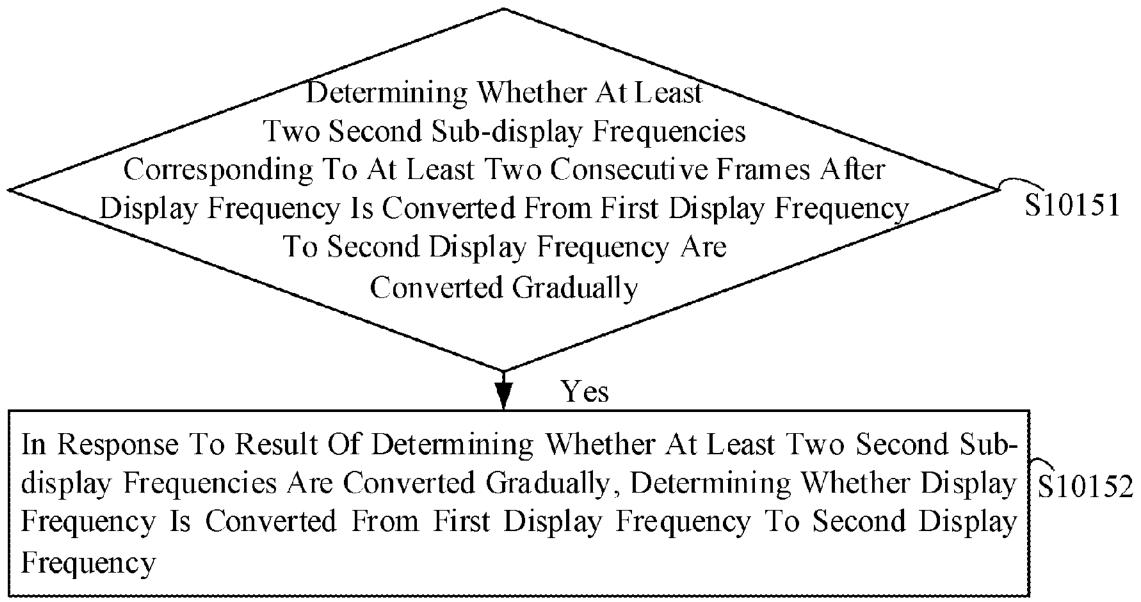

In an embodiment, the second display frequency includes a plurality of second sub-display frequencies, and each of the at least two consecutive frames corresponds to each of the second sub-display frequencies. As shown in FIG. 7, the step S1015 may include, but is not limited to, the following steps.

At Step S10151, it is determined whether at least two second sub-display frequencies corresponding respectively to the at least two consecutive frames after the display frequency is converted from the first display frequency to the second display frequency are gradually converted.

Compared to step S1015, in the present embodiment, "the display frequency being the second display frequency in each of at least two consecutive frames after the display frequency is converted from the first display frequency to the second display frequency in each of the x frames" is instead of "at least two second sub-display frequencies corresponding respectively to the at least two consecutive frames are gradually converted".

At Step S10152, in response to a result of determining whether the at least two second sub-display frequencies corresponding respectively to the at least two consecutive frames after the display frequency is converted from the first display frequency to the second display frequency are gradually converted, determining whether the display frequency is converted from the first display frequency to the second display frequency.

Referring to the above discussion, in comparison with Step S1015, in Steps S10151 to S10152, it is emphasized in the present embodiment that by determining whether the at least two second sub-display frequencies corresponding respectively to the at least two consecutive frames are gradually converted, it is determined whether the display frequency is converted from the first display frequency to the second display frequency. Based on the step S10151, if the result of the step S10151 is "Yes" (that is, the display frequency is changed from the first display frequency to the second display frequency), the step S201 may also be performed.

Similarly, in the present embodiment, the step of "controlling the common voltage to gradually change from the first voltage to the second voltage in the plurality of frames based on the display frequency being the second display frequency in each of at least two consecutive frames after the display frequency is converted from the first display frequency to the second display frequency in each of the x frames", may effectively reduce the jitter of the common voltage of the display panel, and further improving the phenomenon of picture blinking. Meanwhile, the adjustment occurs in at least two frames from the first frame, that is, the phenomenon of picture flickering due to the common voltage adjustment can also be improved.

Different from the above embodiment, regarding "determining whether the display frequency of the display panel is converted from the first display frequency to the second display frequency", the two frames respectively corresponding to the first display frequency and the second display frequency may be the first display frame and the second display frame provided at intervals. Further, if the display frequency is gradually changed within the frames from the first display frame to the second display frame, it may be determined that the display frequency of the display panel is converted from the first display frequency to the second display frequency; Further, there may be a preset frame number, and if the total number of frames from the first display frame to the second display frame mentioned above is less than or equal to the preset frame number, it may be determined that the display frequency of the display panel is changed from the first display frequency to the second display frequency. Further, there may be a preset frame number, and if the total frame number of the frames from the first display frame to the second display frame mentioned above is less than or equal to the preset frame number, it may be determined that the display frequency of the display panel is changed from the first display frequency to the second display frequency It should be noted that the first display frequency and the second display frequency herein may be two frequency ranges that are different or even have a large difference, respectively, to define the switching of the display frequency herein. That is, the transition of the display frequency between the first display frequency and the second display frequency may be referred to as switching of the display frequency. In particular, as discussed above, the second display frequency may include a plurality of different second sub-display frequencies. Similarly, the first display frequency may include a plurality of different first sub-display frequencies. Accordingly, the first display frequency referred to herein may refer to at least one first sub-display frequency, and the second display frequency referred to herein may refer to at least one second sub-display frequency.

In an embodiment, the common voltage is uniformly changed from the first voltage to the second voltage in the plurality of frames. As shown in FIG. 3, for example, in the first frequency switching C1 (the display frequency is decreased from the first display frequency f1 to the second display frequency f2), the common voltage is uniformly increased from the first voltage v1 to the second voltage v2 in the plurality of frames (Fi to F (i+n)). For example, in the second frequency switching C2 (the display frequency is increased from the first display frequency f1 to the second display frequency f2), the common voltage is uniformly decreased from the first voltage v1 to the second voltage v2 in the plurality of frame (Fj to F (j+m)).

In particular, the magnitude of the common voltage may be controlled by the power management module. For example, a plurality of gears for adjusting the magnitude of the common voltage may be provided in the power management module control, and adjacent two gears may be configured to change the voltage values of the common voltage to be same or different, that is, to make changed (increased or decreased) voltage values of the common voltage be same or different. In the present embodiment, the common voltage changes uniformly from the first voltage to the second voltage, so that it is convenient to set multiple gears in the power management module, and provide a more uniform variation of the luminance of a sub-pixel over multiple frames. Further, the picture flicker is improved.

For example, the difference value between the first voltage and the second voltage may be 6V. When the first voltage is increased to the second voltage, the common voltage may be increased by 0.2 V each time (such as each frame), and the common voltage may be increased over 30 frames. When the first voltage is increased to the second voltage, the common voltage may be decreased by 0.5 V each time, and the common voltage may be increased over 12 frames.

In an embodiment, the number of the plurality of frames is larger than two. From the plurality of frames, a ratio of an absolute value of a difference value between the common voltages in any two adjacent frames to an absolute value of a difference value between the display frequencies in the any two adjacent frames is equal to a preset ratio. In particular, when the common voltage is changed from the first voltage to the second voltage in a plurality of frames (at least three frames), there may be a case in which the absolute values of the difference values between the display frequencies in the two adjacent frames are not same with each other, that is, there may be a case in which the display frequency changes non-uniformly in the plurality of frames (at least three frames). Accordingly, in the present embodiment, the variation of the common voltage is also set to a non-uniform variation. That is, in the plurality of frames (at least three frames), the common voltage changes accordingly with the variation of the display frequency. For example, when the absolute values of the difference values between the display frequencies at the two adjacent frames a Hz and 2a Hz over three consecutive frames in the plurality of frames (at least three frames), the absolute values of the difference values between the common voltages at the two adjacent frames may be sequentially b volts and 2b volts.

It will be appreciated that the common voltage in the present embodiment may be varied in accordance with the variation of the display frequency, and the variation of the display frequency in the process of adjusting the common voltage may be compensated in real time more accurately. As discussed above, while the phenomenon of picture flickering may be effectively improved, accuracy of luminance compensation may be further improved.

Figure 8:
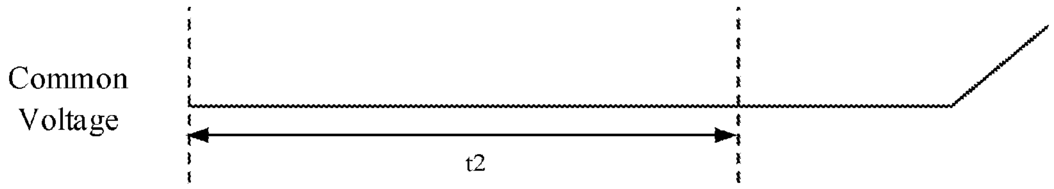
FIG. 8 is a waveform diagram of a common voltage according to an embodiment of the present disclosure.

In an embodiment, if the display frequency is converted from the first display frequency to the second display frequency, the step S2 may include, but is not limited to: in response to determining that the display frequency of the display panel is converted in each of the x frames, and after a preset period from the turned-on time of the display panel, changing the common voltage gradually from the first voltage to the second voltage in the plurality of frames, from at least the last frame in the x frames. In a preset period from the turned-on time of the display panel, the common voltage remains unchanged. In particular, as shown in FIG. 8, according to the control method of the display panels in any one embodiment discussed above, "controlling the common voltage to gradually change from the first voltage to the second voltage in the plurality of frames" is further defined in the present embodiment to be performed after the preset period t2 from the turned-on time of the display panel, and the common voltage is controlled to remain unchanged within the preset period from the turned-on time of the display panel.

Note that the display frequency jitter problem (abnormal display frequency switching) generally occurs within the preset period t2 from the turned-on time of the display panel. As can be appreciated, in the present embodiment, as shown in FIG. 8, during use of the user, the common voltage remains unchanged within the preset period from the turned-on time of the display panel, so that adjustment of the common voltage due to abnormal display frequency switching may be avoided, and waste of control resources may be avoided. In addition, during the manufacturing process, the preset period t2 from the turned-on time of the display panel is generally the optical correction period of the display. Interference to the correction of the optical parameters will be caused by the change in the common voltage. Therefore, in the display panel in the present embodiment, more accurate optical parameters may also be obtained during the manufacturing process.

In particular, the timing control module may be configured to control the change of the common voltage by, but not limited to, an I2C command after the preset period t2 from the turned-on time of the display panel. For example, as shown in FIG. 8, after the preset period t2 from the turned-on time of the display panel, if the display frequency becomes smaller, the common voltage rises.

An embodiment of the present disclosure further provides a display panel including a controller for performing the control method of the display panel as described above.

An embodiment of the present disclosure further provides an electronic terminal including a display panel as described above.

According to embodiments of the present disclosure, a display panel, a control method, and an electronic terminal are provided. When it is determined that a display frequency of the display panel is converted within x frames (x is a positive integer greater than or equal to 2), a common voltage is changed from a first voltage gradually to a second voltage in a plurality of frames, from at least a last frame in the x frames, so as to avoid that the first voltage is instantaneously changed to the second voltage when the display frequency is converted within each of the x frames (that is, in a frame corresponding to the second display frequency). That is, in the present embodiment, the number of frames over which the common voltage is changed from the first voltage to the second voltage may be increased, so that the phenomenon that the picture flashes may be effectively improved.

The display panel, the control method thereof, and the electronic terminal according to the embodiments of the present disclosure are described in detail. The principles and embodiments of the present disclosure are described herein by using specific examples. The description of the above embodiments is merely intended to help understand the technical solution and the core idea of the present disclosure. It will be appreciated by those of ordinary skill in the art that modifications may still be made to the technical solutions described in the foregoing embodiments, or equivalents may be made to some of the technical features therein. These modifications or substitutions do not essentially depart the corresponding technical solutions from the scope of the technical solutions of the various embodiments of the present disclosure.

What is claimed is:

1. A control method of a display panel, comprising:

determining whether a display frequency of the display panel is converted during each of x frames, where x is a positive integer greater than or equal to 2; and in response to determining that the display frequency of the display panel is converted during each of the x frames, changing a common voltage from a first voltage gradually to a second voltage in a plurality of frames beginning from at least a last frame of the x frames, wherein a number of the plurality of frames is larger than two, and in the plurality of frames, a ratio of an absolute value of a difference value between the common voltages in every two adjacent ones of the plurality of frames and an absolute value of a difference value between the display frequencies in the every two adjacent ones of the plurality of frames is equal to a preset ratio.

2. The control method of the display panel of claim 1, wherein the determining of whether the display frequency of the display panel is converted during each of the x frames comprises:

determining whether the display frequency of the display panel is converted from a first display frequency to a second display frequency;

in response to determining that the display frequency of the display panel is converted from the first display frequency to the second display frequency, determining that the display frequency of the display panel is converted during each of the x frames; and in response to determining that the display frequency of the display panel is not converted from the first display frequency to the second display frequency, determining that the display frequency of the display panel is not converted during each of the x frames.

3. The control method of the display panel of claim 2, wherein the determining of whether the display frequency of the display panel is converted from the first display frequency to the second display frequency comprises:

obtaining a blanking duration corresponding to a picture displayed under the display frequency, and determining whether the blanking duration corresponding to the picture displayed under the display frequency changes from a first blanking duration to a second blanking duration; and determining whether the display frequency of the display panel is converted from the first display frequency to the second display frequency, in response to a result of determining whether the blanking duration is changed from the first blanking duration to the second blanking duration.

4. The control method of the display panel of claim 1, wherein the determining of whether the display frequency of the display panel is converted from the first display frequency to the second display frequency comprises:

obtaining an absolute value of a difference value between two blanking durations corresponding to two frame pictures respectively displayed under two display frequencies respectively corresponding to any two frames of the x frames, and determining whether the absolute value of the difference value between the two blanking durations is greater than a time difference threshold, wherein the time difference threshold is positively correlated with x; and determining whether the display frequency is converted during each of the x frames, in response to a result of determining whether the absolute value of the difference value between the two blanking durations is greater than the time difference threshold.

5. The control method of the display panel of claim 2, wherein the determining of whether the display frequency of the display panel is converted from the first display frequency to the second display frequency comprises:

obtaining an absolute value of a difference value between two blanking durations corresponding to two frame pictures respectively displayed under two of display frequencies respectively corresponding to any two frames of the x frames, and determining whether the absolute value of the difference value between the two blanking durations is greater than a time difference threshold, where the time difference threshold is positively correlated with x; and determining whether the display frequency is converted during each of the x frames, in response to a result of determining whether the absolute value of the difference value between the two blanking durations is greater than the time difference threshold.

6. The control method of the display panel of claim 3, wherein the determining of whether the display frequency of the display panel is converted from the first display frequency to the second display frequency comprises:

obtaining an absolute value of a difference value between two blanking durations corresponding to two frame pictures respectively displayed under two of display frequencies respectively corresponding to any two frames of the x frames, and determining whether the absolute value of the difference value between the two blanking durations is greater than a time difference threshold, wherein the time difference threshold is positively correlated with x; and determining whether the display frequency is converted during each of the x frames, in response to a result of determining whether the absolute value of the difference value between the two blanking durations is greater than the time difference threshold.

7. The control method of the display panel of claim 2, wherein the determining of whether the display frequency of the display panel is converted from the first display frequency to the second display frequency comprises:

determining whether the display frequency is the second display frequency in each of at least two consecutive frames after the display frequency is converted from the first display frequency to the second display frequency; and in response to a result of determining whether the display frequency is the second display frequency in at least two consecutive frames after the display frequency is converted from the first display frequency to the second display frequency, determining whether the display frequency is converted from the first display frequency to the second display frequency;

wherein the changing of the common voltage from the first voltage gradually to the second voltage in the plurality of frames, from at least the last frame of the x frames comprises:

changing the common voltage from the first voltage gradually to the second voltage within the plurality of frames, at or after a last one of the at least two consecutive frames.

8. The control method of the display panel of claim 7, wherein the second display frequency comprises a plurality of second sub-display frequencies, and the at least two consecutive frames correspond to the second sub-display frequencies, respectively;

the determining of whether the display frequency is the second display frequency in each of at least two consecutive frames after the display frequency is converted from the first display frequency to the second display frequency comprises:

determining whether at least two second sub-display frequencies corresponding respectively to the at least two consecutive frames after the display frequency is converted from the first display frequency to the second display frequency are converted gradually; and in response to a result of determining whether the at least two second sub-display frequencies corresponding respectively to the at least two consecutive frames after the display frequency is converted from the first display frequency to the second display frequency are converted gradually, determining whether the display frequency is converted from the first display frequency to the second display frequency.

9. The control method of the display panel of claim 1, wherein the common voltage is uniformly changed from the first voltage to the second voltage within the plurality of frames.

10. The control method of the display panel of claim 1, wherein in response to determining that the display frequency of the display panel is converted during each of the x frames, the changing of the common voltage gradually from the first voltage to the second voltage in the plurality of frames, from at least the last frame of the x frames comprises:

in response to determining that the display frequency of the display panel is converted during each of the x frames, and after a preset time interval from a turned-on time of the display panel, changing the common voltage gradually from the first voltage to the second voltage in the plurality of frames, from at least the last frame of the x frames, wherein during the preset time interval from the turned-on time of the display panel, the common voltage remains unchanged.

11. A display panel, comprising:

a controller configured to:

determine whether a display frequency of the display panel is converted during each of x frames, wherein x is a positive integer greater than or equal to 2; and in response to determining that the display frequency of the display panel is converted during each of the x frames, change a common voltage from a first voltage gradually to a second voltage within a plurality of frames, from at least a last frame of the x frames, wherein a number of the plurality of frames is larger than two, and in the plurality of frames, a ratio of an absolute value of a difference value between the common voltages in every two adjacent ones of the plurality of frames and an absolute value of a difference value between the display frequencies in the every two adjacent ones of the plurality of frames is equal to a preset ratio.

12. An electronic terminal comprising the display panel comprising:

a controller configured to:

determine whether a display frequency of the display panel is converted during each of x frames, wherein x is a positive integer greater than or equal to 2; and in response to determining that the display frequency of the display panel is converted during each of the x frames, change a common voltage from a first voltage gradually to a second voltage within a plurality of frames, from at least a last frame of the x frames, wherein a number of the plurality of frames is larger than two, and in the plurality of frames, a ratio of an absolute value of a difference value between the common voltages in every two adjacent ones of the plurality of frames and an absolute value of a difference value between the display frequencies in the every two adjacent ones of the plurality of frames is equal to a preset ratio.

* * * * *